(12) United States Patent
Torres Martinez

(10) Patent No.: US 10,668,587 B2
(45) Date of Patent: Jun. 2, 2020

(54) DEVICE FOR THE MACHINING OF CURVED LAMINAR SURFACES

(71) Applicant: Manuel Torres Martinez, Pamplona (ES)

(72) Inventor: Manuel Torres Martinez, Pamplona (ES)

( * ) Notice: Subject to any disclaimer, the term of this patent is extended or adjusted under 35 U.S.C. 154(b) by 0 days.

(21) Appl. No.: 16/075,400

(22) PCT Filed: Jan. 27, 2017

(86) PCT No.: PCT/ES2017/070047
§ 371 (c)(1),
(2) Date: Aug. 3, 2018

(87) PCT Pub. No.: WO2017/137642
PCT Pub. Date: Aug. 17, 2017

(65) Prior Publication Data
US 2019/0039196 A1 Feb. 7, 2019

(30) Foreign Application Priority Data
Feb. 8, 2016 (ES) .................................. 201630139

(51) Int. Cl.
*B23Q 1/76* (2006.01)
*B23Q 3/06* (2006.01)
(Continued)

(52) U.S. Cl.
CPC ............... *B23Q 1/76* (2013.01); *B23Q 1/265* (2013.01); *B23Q 1/766* (2013.01); *B23Q 3/062* (2013.01);
(Continued)

(58) Field of Classification Search
CPC .......... B23Q 1/76; B23Q 1/763; B23Q 1/265; B23Q 3/00; B23Q 3/06; B23Q 3/062;
(Continued)

(56) References Cited

U.S. PATENT DOCUMENTS 2,290,061 A 7/1942 Matia
4,762,261 A * 8/1988 Hawly ..................... B21J 15/14
227/111

(Continued)

FOREIGN PATENT DOCUMENTS

EP 1884313 A2 2/2008

OTHER PUBLICATIONS

International Search Report dated Apr. 24, 2017 for PCT/ES2017/070047.

*Primary Examiner* — Alan Snyder
*Assistant Examiner* — Yasir A Diab
(74) *Attorney, Agent, or Firm* — Lucas & Mercanti, LLP

(57) ABSTRACT

A device for the machining of curved laminar surfaces, having a first part including a tool for machining the concave face of the surface, and first pressure device in contact with the concave face of the surface, a second part including second pressure device in contact with the convex face of the surface, and devices synchronizing the movements of the first and second parts is provided. The tool has a circular shape for the radial machining of the concave face, and the first pressure device has at least one disc parallel to the tool, the tool and disc disposed on a rotary shaft and both having a radius equal to or less than the radius of curvature of the concave face.

10 Claims, 5 Drawing Sheets

(51) Int. Cl.
*B23Q 1/26* (2006.01)
*B23Q 27/00* (2006.01)
*B23Q 11/10* (2006.01)
*B23Q 16/10* (2006.01)

(52) U.S. Cl.
CPC ........... *B23Q 3/069* (2013.01); *B23Q 27/006* (2013.01); *B23Q 11/10* (2013.01); *B23Q 16/102* (2013.01); *B23Q 2240/005* (2013.01)

(58) Field of Classification Search
CPC ........ B23Q 3/063; B23Q 3/064; B23Q 3/068; B23Q 27/006; B23Q 16/102; B23Q 2703/04; B23B 2215/04; B23C 3/02; B23C 3/13; B23C 3/16; Y10T 408/03; Y10T 408/561; Y10T 408/5612; Y10T 408/5623; Y10T 408/56245; Y10T 408/91; Y10T 408/93; Y10T 409/303808; Y10T 409/306216; Y10T 409/30756; Y10T 409/30868
See application file for complete search history.

(56) References Cited

U.S. PATENT DOCUMENTS

| | | | | |
|---|---|---|---|---|
| 4,787,787 | A | 11/1988 | Hopwell et al. | |
| 4,885,836 | A * | 12/1989 | Bonomi | B21J 15/10 29/524.1 |
| 4,995,148 | A * | 2/1991 | Bonomi | B21J 15/10 29/26 A |
| 5,163,793 | A * | 11/1992 | Martinez | B21J 15/10 269/309 |
| 5,364,083 | A * | 11/1994 | Ross | B23Q 1/035 269/21 |
| 6,014,802 | A * | 1/2000 | Guerin | B21J 15/10 29/407.01 |
| 7,028,997 | B2 * | 4/2006 | Takahashi | B23B 29/022 267/137 |
| 7,507,059 | B2 * | 3/2009 | Hamann | B23Q 1/766 29/34 B |
| 2003/0221306 | A1 * | 12/2003 | Day | B21J 15/14 29/525.01 |
| 2005/0172481 | A1 * | 8/2005 | Herrmann | B21J 15/14 29/715 |
| 2006/0039765 | A1 | 2/2006 | Hamann | |
| 2007/0274797 | A1 | 11/2007 | Panczuk et al. | |
| 2008/0209712 | A1 * | 9/2008 | Bisiach | B21J 15/14 29/592 |
| 2009/0140482 | A1 * | 6/2009 | Saberton | B23Q 1/035 269/296 |
| 2009/0143207 | A1 * | 6/2009 | Wampler | B23C 1/002 483/51 |

* cited by examiner

DEVICE FOR THE MACHINING OF CURVED LAMINAR SURFACES

CROSS REFERENCE TO RELATED APPLICATION

This Application is a 371 of PCT/ES2017/070047 filed on Jan. 27, 2017, which, in turn, claimed the priority of Spanish Patent Application No. P201630139 filed on Feb. 8, 2016, both applications are incorporated herein by reference.

TECHNICAL FIELD

The present invention is related to the machining of thin curved laminar surfaces, proposing a device that enables machining of the laminar surface under advantageous application conditions, in order to eliminate the excess material of said laminar surface for the purposes of reducing the weight thereof.

STATE OF THE ART

In the aeronautical sector, large laminar panels are used to manufacture aircraft fuselage and wings. A fundamental aspect of the manufacture of said aircraft parts is the weight, such that the laminar panels should be made thick enough to support the necessary mechanical resistance, but at the same time be as thin as possible so that the weight of the panel is reduced.

To reduce the weight of the panels in the areas where required, the use of milling devices for machining is known. These devices must have a specific design that enables the panels to be machined without causing deformations, since by having panels with a reduced thickness, the machining tool itself can deform the panel when resting on it during machining.

To avoid this problem devices for machining are known, such as the one described in the document EP 1.591.195 B1, which comprises two parts that move opposite to each other and in a synchronised way during machining. Specifically, the device for machining comprises a first part including a machining tool and first pressure means, which are disposed on the face of the panel to be machined, and a second part with second pressure means that act as a dolly with respect to the area on which the machining is performed, and which are disposed on the opposite face of the panel to be machined, such that both parts of the device for machining are always opposite each other, moving in a synchronised way with respect to the panel that is machined, with which machining operations can be performed on the laminar panels without them becoming deformed.

This device is configured to reduce the thickness of the panels used in the construction of the aircraft fuselage, which are panels with a very wide radius of curvature; however, in the panels used in the construction of the wings, and specifically on the leading edge of the wings, this device is not suitable, since the leading edge has a very small radius of curvature, between 17 and 100 mm, such that the first part of the device for machining, due to the configuration thereof, cannot access correctly to machine the area of the panel where the radius of curvature is further reduced.

Therefore, it makes it necessary to have a device that enables effective machining of curved laminar surfaces with a reduced radius, such as for example aircraft leading edges.

OBJECT OF THE INVENTION

According to the invention, a device for machining curved laminar surfaces, such as for example the leading edges of aircraft wings, which have a concave face with a very small radius of curvature, approximately 17 mm, is proposed.

The device for machining of the invention comprises:
a first part including a tool configured for machining the concave face of the curved laminar surface, and first pressure means configured to come into contact with the concave face of the curved laminar surface,
a second part including second pressure means configured to come into contact with the convex face of the curved laminar surface, and
synchronisation means for synchronising the movements of the first and second part of the device for machining, such that when used, both parts move opposite to each other and in a synchronised way.

According to the invention, the tool of the first part of the device for machining has a circular shape for the radial machining of the concave face of the curved laminar surface, while the first pressure means comprise at least one disc that is parallel to the tool, wherein the tool and the at least one disc are disposed on a rotary shaft, and both have a radius equal to or less than the radius of curvature of the concave face of the curved laminar surface. Thus, with this configuration of the first part of the device for machining the tool is able to access areas of the curved laminar surface with a reduced radius of curvature.

Preferably, the first part of the device for machining comprises a tool and the pressure means comprises two discs, one disc being disposed on each side of the tool, such that the guiding of the tool is improved.

The tool is fixed to the rotary shaft, such that the tool rotates integrally with the rotary shaft, and the discs are assembled on the rotary shaft by means of bearings, such that the discs rotate freely with respect to the rotary shaft.

It is envisaged that the discs of the pressure means are made of a compressible material, preferably an elastomer material. According to an exemplary embodiment, the discs are entirely made of compressible material.

According to another exemplary embodiment, the discs comprise a rigid inner core and an outer part made of compressible material.

The first part of the device for machining comprises a support of the tool and of the first pressure means, wherein the support has a coupling that is configured to establish a rotary joint with the head of a machine-tool that is responsible for moving the device on the machining area.

The support is configured so that the tool and the first pressure means of the first part of the device for machining are laterally moved with respect to the coupling between the support and the head. Thus, the head is separately laterally with respect to the machining area, preventing the head from colliding with the curved laminar surface that is machined, since the head usually has large dimensions, and the area that is machined usually has a very small radius of curvature, which makes it difficult for the tool to access the area to be machined.

Moreover, to further separate the head from the machining area it is envisaged that the coupling has an extension element for the joining thereof to the head, or that the coupling with the head is a telescopic coupling that enables the distance between the support and the head to vary.

It is also envisaged that the discs of the pressure means have different outer diameters, such that the diameters of the discs are selected based on the configuration of the curved laminar surface to be machined.

On the other hand, the discs of the pressure means comprise means configured to vary the outer diameter of the discs, such as for example inflatable wheels that enable the separation between the rotary shaft and the discs that are assembled on said rotary shaft to vary.

Thus, a device for machining is obtained, which given the constructive and functional characteristics thereof enables curved laminar surfaces with radii with curvature to be machined.

DETAILED DESCRIPTION OF THE INVENTION

Figure 1:
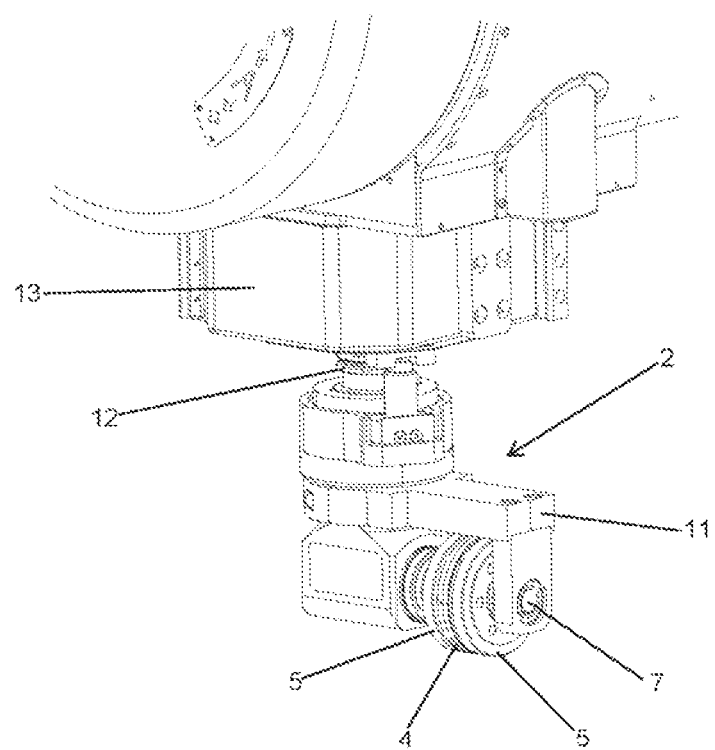
FIG. 1 shows the first part of the device for machining of the invention coupled to a head of a machine-tool.

The invention relates to a device for the machining of curved laminar surfaces (1), such as for example the leading edges of aircraft wings. This type of curved laminar surfaces (1) has a concave face (1.1) and a convex face (1.2) opposite the concave face (1.1). The concave face (1.1) has a very small radius of curvature (r), which in the area of the primary longitudinal axis (1.3) of the curved laminar surface (1), wherein the radius of curvature (r) is smaller, can be approximately 17 mm.

To machine this type of curved laminar surfaces (1) with a very small radius of curvature (r) the invention proposes a device for machining that comprises a first part (2) that is disposed on the concave face (1.1) to be machined of the curved laminar surface (1), and a second part (3) that is disposed on the convex face (1.2) of the curved laminar surface (1), and synchronisation means that order the movements of the first part (2) and the second part (3) of the device for machining so that they move opposite to each other and in a synchronised way with respect to the curved laminar surface (1). Thus, the first part (2) functions as an operational element of the machining and the second part (3) functions as a dolly with respect to the area where the machining is performed.

The first part (2) has a tool (4) configured for machining the concave face (1.1) of the curved laminar surface (1), and first pressure means (5) configured to come into contact and put pressure on the concave face (1.1) of the curved laminar surface (1), while the second part (3) has second pressure means (6) configured to come into contact and put pressure on the convex face (1.2) of the curved laminar surface (1).

The tool (4) has a circular shape for the radial machining of the concave face (1.1) of the curved laminar surface (1), while the first pressure means (5) comprise at least one disc, wherein both the tool (4) and the at least one disc have a radius that is equal to or less than the radius of curvature (r) that the concave face (1.1) has in the area of the primary longitudinal axis (1.3), such that it is ensured that the device for machining can access all areas of the concave face (1.1) of the curved laminar surface (1).

Figure 2:
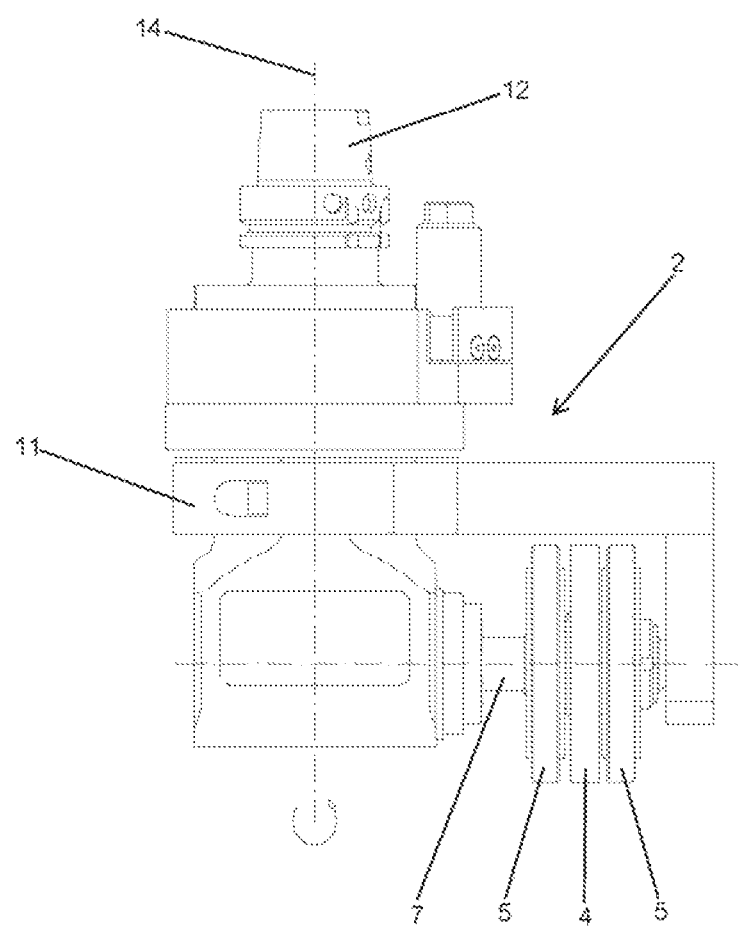
FIG. 2 shows a front view of the first part of the device for machining of the invention.

As shown in the exemplary embodiment of FIG. 2, the first part (2) of the device for machining has a circular tool (4) and first pressure means (5) formed by two discs that are disposed in a substantially parallel way to the tool (4), and wherein one disc is disposed on each side of the tool (4). In any case, the first part (2) could comprise first pressure means (5) with a single disc disposed parallel to the tool (4).

Figure 3:
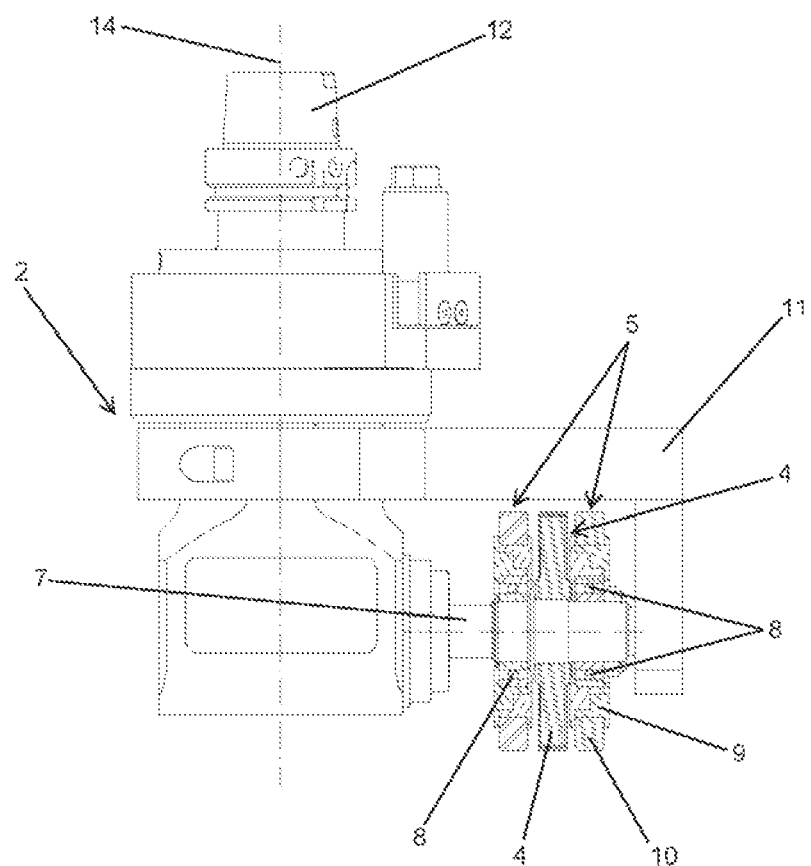
FIG. 3 shows a partial cross section view of the previous figure.

As shown in the partial cross section view of FIG. 3, the tool (4) and the discs are disposed on a same rotary shaft (7), specifically the tool (4) is fixed to the rotary shaft (7) such that the tool (4) rotates integrally with the rotary shaft (7), while the discs are assembled on the rotary shaft (7) by means of bearings (8), such that the discs rotate freely with respect to the rotary shaft (7).

It is envisaged that the discs of the first pressure means (5) are made of a compressible material, preferably an elastomer material. Thus, and according to the exemplary embodiment shown in FIG. 3, the discs comprise a rigid inner core (9) and an outer part (10) made of compressible material, which is the part of the disc that is in contact with the concave face (1.1) of the curved laminar surface (1). According to another exemplary embodiment not shown in the figures, the discs can be entirely made of compressible material, such as elastomer.

Thus, by using pressure means (5) with two discs, one on each side of the tool (4), the guiding of the tool (4) is improved during machining; furthermore, the use of compressible material in the first pressure means (5) allows the pressure exerted by the tool (4) on the curved laminar surface (1) during machining to be regulated in a more efficient way.

Figure 4:
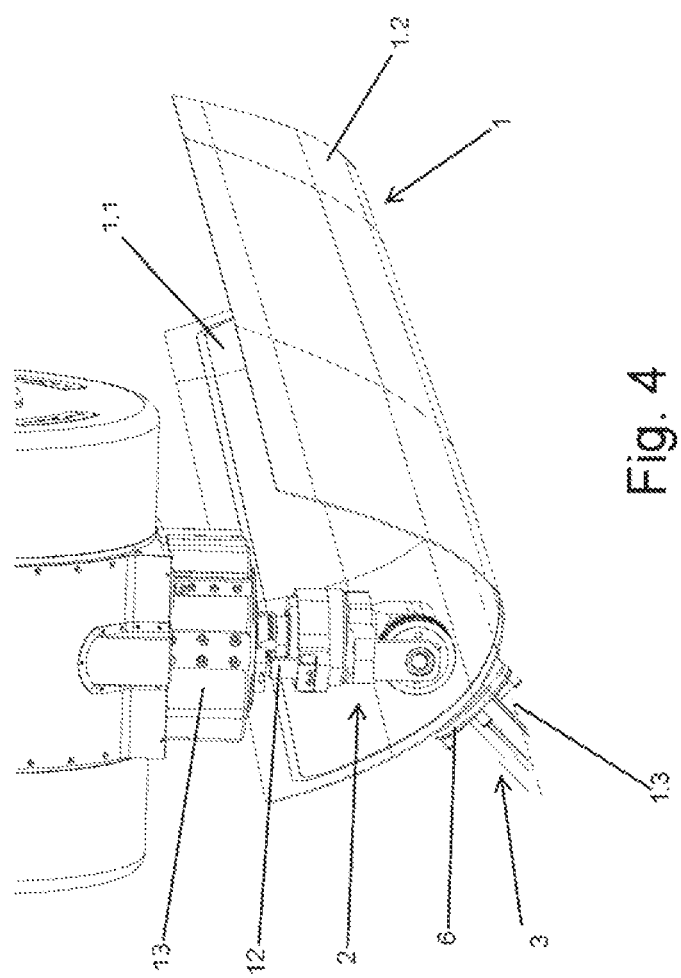
FIG. 4 is a perspective view wherein a curved laminar surface that is being machined is shown, with the first part of the device machining the concave face of the laminar surface, and the second part of the device resting on the convex face of the laminar surface.
Figure 5:
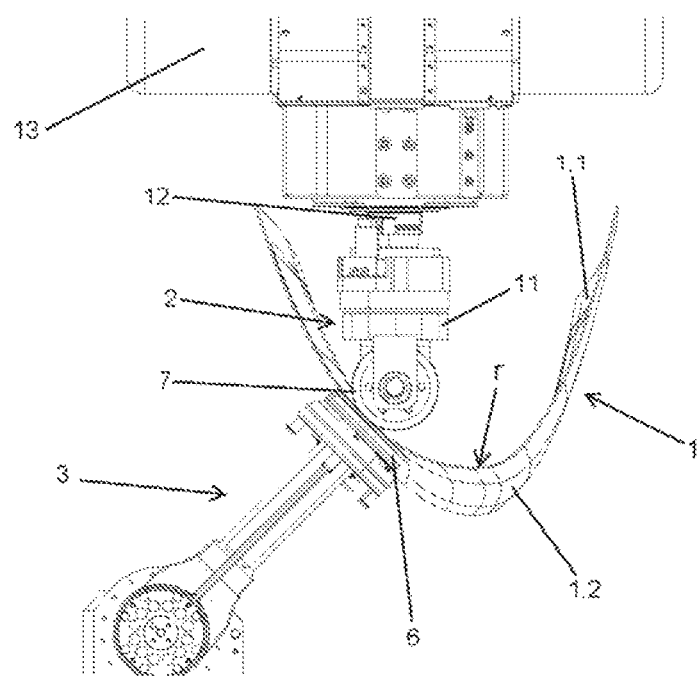
FIG. 5 shows a side view of previous figure.

The first part (2) of the device for machining comprises a support (11) of the tool (4) and of the first pressure means (5), which has a coupling (12) for the connection thereof to a head (13) of a machine-tool, not object of the present invention, as shown in FIGS. 4 and 5. The coupling (12) is configured to establish a rotary joint with respect to the head (13) of the machine-tool, such that the support (11) can rotate with respect to the head (13) on the axis (14) represented in the figures.

It is envisaged that the tool (4) and the first pressure means (5) of the first part (2) of the device for machining are laterally moved with respect to the axis (14) of the coupling (12) between the support (11) and the head (13). Thus, lateral separation is created between the head (13) and the elements of the first part (2) of the device for machining that they have to access to machine areas of the concave face (1.1) of the curved laminar surface (1) with a very small radius of curvature (r), preventing the head (13), due to the large dimensions thereof, from colliding with some part of the curved laminar surface (1) to be machined.

Furthermore, and to prevent this problem of the head (13) colliding with some part of the curved laminar surface (1), it is envisaged that the coupling (12) with the head (13) is a telescopic coupling that enables the separation distance between the support (11) and the head (13) to vary. There is also the possibility that the coupling (12) has an extension element for the joining thereof to the head (13), such that based on the configuration of the curved laminar surface (1) to be machined an extension element is used with the required distance. In any of the two cases, the distance between the head (13) and the support (11) increases, wherein the tool (4) and the first pressure means (5) are disposed, ensuring that the head (13) does not collide with the curved laminar surface (1) to be machined.

The discs of the first pressure means (5) can have different external diameters, such that based on the configuration of the curved laminar surface (1) to be machined the two discs are disposed on the rotary shaft (7), wherein each disc has an outer diameter according to the radius of curvature (r) to be machined.

The discs of the first pressure means (5) comprise means configure to vary the external diameter of the discs. These can be any type of mechanical, pneumatic or electrical means that enable the outer diameter of the discs to vary, either envisioned to use inflatable wheels that enable the distance between the rigid inner core (9) and the bearings (8) to vary, or in the case that the discs are entirely made of compressible material, which enable the distance between the bearings (8) and the body of compressible material to vary.

Given the foregoing, the machining of the curved laminar surface (1) is carried out, following paths perpendicular to the primary longitudinal axis (1.3); thus, firstly, the first part (2) of the device for machining is disposed on the concave face (1.1) of the curved laminar surface (1), and the second part (3) of the device for machining is arranged on the convex face (1.2), in a position opposite to where the first part (2) is arranged.

Once like this, the rotary shaft (7) begins to rotate actuating the tool (4) which machines the concave face (1.1) of the curved laminar surface (1) when the first part (2) of the device advances, following paths perpendicular to the primary longitudinal axis (1.3) and at the same time that the discs of the first pressure means (5) freely rotate, having a rolling support on the concave face (1.1). On the other hand, the synchronisation means of the device for machining synchronise the movement of the second pressure means (6) of the second part (3) of the device for machining so that they copy the movements of the first part (2). Thus, the surface that is being machined is completely covered by the first pressure means (5) and second pressure means (6), preventing the curved laminar surface (1) from deforming during machining.

The invention claimed is:

1. A device for the machining of curved laminar surfaces that have a concave face to be machined with a radius of curvature and a convex face opposite the concave face, the device comprising:
    a first part adapted to move along a first surface side of a curved laminar surface of a manufactured element, the first surface side having a concave face, the concave face having a first radius of curvature, the curved laminar surface further comprising a second surface side having a convex face, the first part including:
    a support comprising a coupling, the coupling adapted to be connected to a head of a machine tool;
    a rotary shaft coupled to the support;
    a tool disposed on the rotary shaft, the tool adapted to rotate, the tool adapted to machine the concave face of the curved laminar surface, the tool having a first tool side and a second tool side opposite the first tool side, the tool having a second radius of curvature smaller than the first radius of curvature; and
    a first pressure means adapted to contact the concave face of the curved laminar surface, the first pressure means comprising a first disk disposed on the rotary shaft on the first tool side of the tool and a second disk disposed on the rotary shaft on the second tool side of the tool, the first and second disks adapted to rotate, the first disk having a third radius of curvature smaller than the first radius of curvature, the second disk having a fourth radius of curvature smaller than the first radius of curvature;
    a second part including second pressure means adapted to contact a convex face of the curved laminar surface of the manufactured element, the convex face being opposite the concave face, the second pressure means adapted to move relative to the convex face; and
    synchronisation means for synchronising the movements of the first part and the second part of the device for machining, such that when used, the first and second parts move on opposite sides of the manufactured element and in a synchronised way.

2. The device for the machining of curved laminar surfaces, according to claim 1, wherein the tool is fixed to the rotary shaft, rotating both integrally, and the first and second disks are assembled on the rotary shaft by means of bearings, the first and second disks rotating freely with respect to the rotary shaft.

3. The device for the machining of curved laminar surfaces, according to claim 1, wherein the first and second disks of the first pressure means are made of a compressible material.

4. The device for the machining of curved laminar surfaces, according to claim 3, wherein the first and second disks comprise a rigid inner core and an outer part made of compressible material.

5. The device for the machining of curved laminar surfaces, according to claim 1, wherein the coupling is configured to establish a rotary joint with the head of the machine-tool.

6. The device for the machining of curved laminar surfaces, according to claim 5, wherein the tool and the first pressure means are laterally moved with respect to the coupling between the support and the head.

7. The device for the machining of curved laminar surfaces, according to claim 5, wherein the coupling has an extension element for the joining thereof to the head.

8. The device for the machining of curved laminar surfaces, according to claim 5, wherein the coupling with the head is a telescopic coupling that enables the distance between the support and the head to vary.

9. The device for the machining of curved laminar surfaces, according to claim 1, wherein the first and second disks of the first pressure means have different outer diameters.

10. The device for the machining of curved laminar surfaces, according to claim 1, wherein the first and second disks of the first pressure means comprise means configured to vary the outer diameter of the discs.

* * * * *